No. 760,958. PATENTED MAY 24, 1904.
C. W. CONNER.
EYEGLASS HOLDER.
APPLICATION FILED FEB. 21, 1903.
NO MODEL.
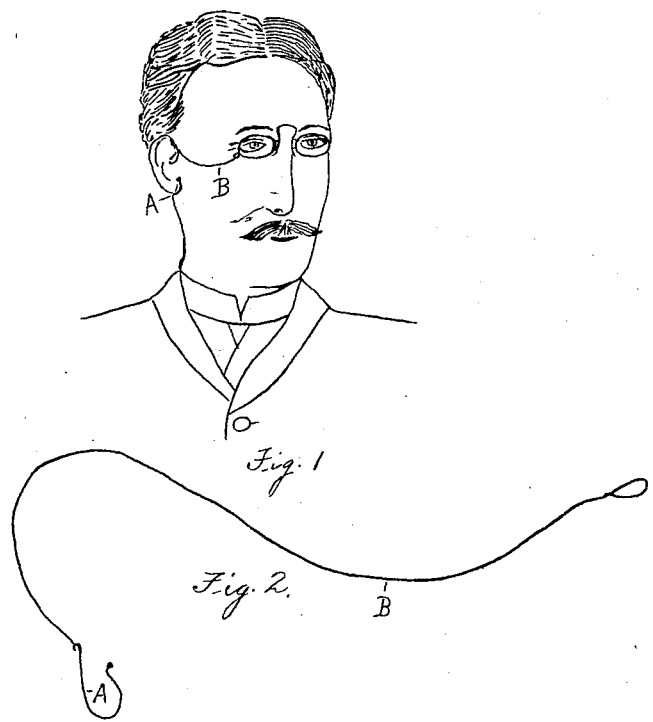
Witnesses
J. M. Johnson
F. E. Mathewson
Inventor
Charles W Conner
By his Attorney
Geo J Kirby No. 760,958. Patented May 24, 1904.

UNITED STATES PATENT OFFICE.

CHARLES W. CONNER, OF INDIANAPOLIS, INDIANA, ASSIGNOR TO GEORGE J. KIRBY, OF PROVIDENCE, RHODE ISLAND.

EYEGLASS-HOLDER.

SPECIFICATION forming part of Letters Patent No. 760,958, dated May 24, 1904.

Application filed February 21, 1903. Serial No. 144,535. (No model.)

*To all whom it may concern:*

Be it known that I, CHARLES W. CONNER, a citizen of the United States, residing at Indianapolis, in the State of Indiana, have invented a new and useful Improvement in Eyeglass-Holders, of which the following is a specification.

My invention relates to improvements in eyeglass-retainers designed for use particularly in connection with the type of glasses retained by clamping the bridge of the nose.

The object in view is the provision of means for preventing eyeglasses from falling, which means shall be of neat appearance and comfortable to the wearer.

To accomplish this and other objects, I employ elements disclosed in the accompanying drawings which consist generically of means for engaging and fitting about the lobe of the ear of the wearer and a flexible connection between said engaging means and a lens of a pair of glasses.

It further consists, in combination with a pair of glasses, of a hook the size and shape designed to fit snugly about the lobe of the ear of the wearer and a flexible connection attached to said hook and to one of the lenses of said glasses.

It also consists in certain other novel constructions, combination, and arrangement of parts, as will be hereinafter fully described and claimed.

In the accompanying drawings, Figure 1 represents a perspective view of an eyeglass-retainer embodying the features of the present invention and illustrated in use. Fig. 2 represents a similar view of the same detached.

It has been common in the present art to provide chain or other flexible connection for attachment to one of the lenses of a pair of clamp-eyeglasses and to extend said chain rearwardly and attach the same at any suitable point, as by the provision of a hair-pin or connecting the same to apparel of the wearer or by the provision of a spring-clamp encircling the ear and receiving such chain. The objection to the use of hair-pins will be evident from the fact that the same are liable to accidentally loosen, and the securing means used for attaching the chain or flexible connection to the apparel of the wearer necessitates the use of undesirably lengthy and weighty connecting means, while the clamp about the ear is commonly known to be seriously objectionable in that it is not only annoying because of the constant pressure upon the ear, but actually occasions soreness in many instances. I overcome all of these objections by my invention, an embodiment of which is illustrated in the accompanying drawings, in which the letter A indicates a hook of the shape and size designed to fit snugly about the lobe of the ear of a wearer, to which is connected a chain, cord, or other flexible attaching means B, which in operation is passed about the back of the ear and forwardly on a line parallel with the horizontal plane of the eyes and attached to a lens of the pair of glasses to be retained in position.

In operation the hook A is positioned, as indicated in Fig. 1, snugly fitting about the lobe of the ear of the wearer, and the cord or chain B rests lightly upon the ear at the juncture with the head, so that should the glasses to which the said cord or chain is attached become dislodged and fall from the nose the same would be supported by the chain and saved from injury. That portion of the cord at the rear of the ear is not pressed tightly against the ear, and the presence of the retainer is hardly appreciable to the wearer, no clamping or straining action being occasioned thereby.

Although I have set forth in detail a particular embodiment of the present invention, yet any slight changes may be made without deviation from the spirit and scope of the invention.

Having thus fully described my invention, what I claim as new, and desire to secure by Letters Patent, is—

1. An eyeglass-holder comprising a single, open ear-engaging hook having its members extended in approximately parallel planes throughout their length and spaced apart a distance substantially equal to the thickness of the edge of the ear, said hook being adapted to be positioned on the ear by a longitudinal movement, and means connected to the hook, adapted and designed to be passed over the ear and attached to a pair of eyeglasses.

2. An eyeglass-holder comprising a hook of a size and shape designed to fit snugly the edge of the ear, and a flexible connection carried thereby adapted and designed to be passed over the ear, and attached to a pair of eyeglasses.

CHAS. W. CONNER.

Witnesses:
T. F. HARRISON,
M. I. RISHER.